May 26, 1931.  H. M. BLINN  1,807,564
PRESSURE REGULATING VALVE
Filed Nov. 18, 1927
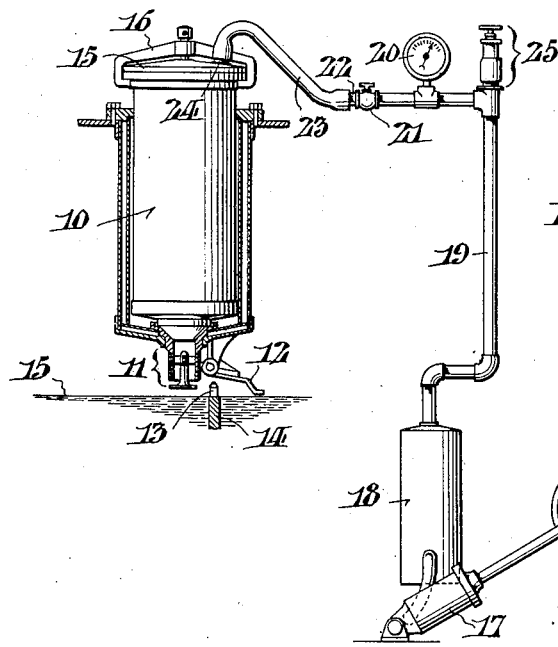
FIG. I.
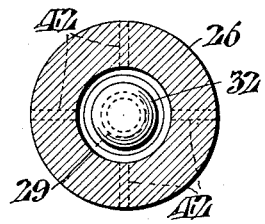
FIG. III.
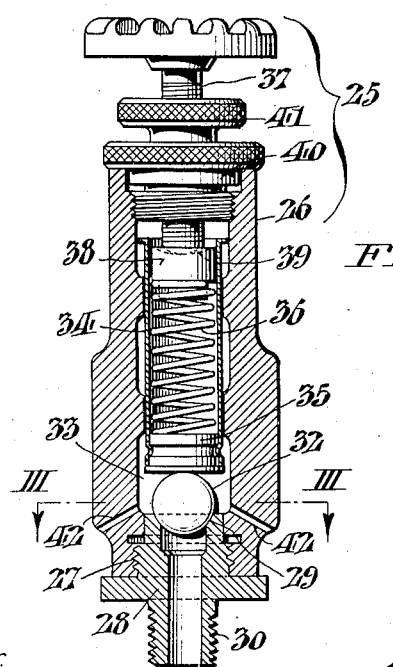
FIG. II.
WITNESSES
INVENTOR:
Harry M. Blinn,
BY
ATTORNEYS.

Patented May 26, 1931

1,807,564

UNITED STATES PATENT OFFICE

HARRY M. BLINN, OF BALTIMORE, MARYLAND, ASSIGNOR TO DOUGHNUT MACHINE CORPORATION, OF NEW YORK, N. Y., A CORPORATION OF NEW YORK

PRESSURE REGULATING VALVE

Application filed November 18, 1927. Serial No. 234,273.

This invention relates to valves of a type useful in maintaining by relief, or bleeding action, a constant or equalized static pressure in fluid systems employing a continuously operating compressor or pump.

More particularly in instances where air is used as the pressure medium, for example, in apparatus for forming articles such as confections or pastries from plastic material, great difficulty has been experienced in maintaining, by bleeding action, the desired degree of static pressure for expulsion of the plastic material through forming dies with assurance of uniformity in the size of the product. This has been due to lack of delicacy in the operation of the pressure regulating valves, i. e., failure of the valve closures to respond properly to the pulsations of the pump and to close accurately upon their seats.

The object of my invention is to overcome the deficiencies above pointed out through provision of a pressure regulating valve in which the closure member is accorded absolute freedom of lateral action in accurately seeking its seat notwithstanding subjection from above to regulatable yielding means tending to resist its opening.

In the drawings herewith, Fig. I is a diagrammatic illustration of an apparatus for forming doughnuts with the aid of an air pressure system in connection with which the valve of my invention is advantageously employable.

Fig. II is an axial sectional view of the valve on a larger scale; and,

Fig. III is a transverse section, taken as indicated by the arrows III—III in Fig. II.

Referring first more particularly to the apparatus shown in Fig. I of these illustrations, 10 designates a receptacle which contains dough subject to air pressure from above, said container having at its bottom a die mechanism 11 of suitable design to fashion and release annular formations, such as doughnuts, incidentally to operation through a lever 12 adapted to be engaged by projections 13 on progressing vanes 14 moving in cooking liquor 15. The container 10 is closed at the top by a lid 15 which is secured thereon by a yoke clamp 16 in airtight relation. The air above the dough within the container 10 is maintained under pressure by a continuously operating pump 17 discharging into a tank 18. The piping 19 leading from the tank 18 has interposed in it, a pressure gauge 20 as well as a shut-off valve 21, the nipple 22 of which is connected, by a flexible hose 23, to a similar nipple 24 projecting from the lid 15 of the receptacle 10. The valve with which my invention is more particularly concerned is shown at 25 in Fig. I, and, as hereinafter fully explained, is regulatable to permit release, in synchronism with the pulsations of the pump 17, of a certain amount of air from the system so that a constant static pressure is maintained in the tank 10 to force a definite unvarying amount of dough through the die mechanism 11 at the bottom.

With reference now in detail to Figs. II and III, it will be observed that the valve 25 comprises a casing 26 which is generally cylindric in form. At its lower end the casing 26 is internally threaded as at 27 to receive a removable tubular bushing 28 which provides the valve seat 29. As shown the reduced depending portion of the bushing 28 is threaded as at 30 for connection into the piping 19 of the air system embodied in the apparatus of Fig. I. With the seat 29 co-operates a valve closure 32 having, in the present instance, the form of a ball, the same occupying a chamber 33 set apart in the lower portion of the valve casing 26.

The means to resist opening of the valve 32 includes a pressure-influenced member in the form of a plunger 34 having a tubular body closed at the bottom by a plug 35, said plunger engaging the bore of the casing 26 with a good sliding fit so as to be confined to axial movement relative to the valve seat 29. For permanent retainment, the plug 35 is provided with a circumferential groove into which the metal of the tubular body of the plunger 34 is displaced, as clearly shown in Fig. II. A light helical compression spring 36 made of comparatively fine wire is disposed within the hollow of the plunger 34 with provision of slight clearance thereabout so as to be constrained against sidewise flexure in accommodating the rise and fall of the valve closure ball 32. At its upper end the spring 36 abuts a follower 38 fitting within the bore of the plunger 34. The force of the spring 36 is regulatable by means of a hand screw 37 whereof the end of the shank is rounded as shown in Fig. II and engages a concaved depression 39 of larger radius in the top of the follower 38, at one point only. This arrangement, it will be seen, avoids imposition of binding restraint upon the plunger 34. The screw 37 has bearing in a cap piece 40 which is threaded into the upper end of the valve casing 26; and a thumb nut 41 is provided to fix the screw 37 in adjusted positions, said thumb nut clamping against the top of the cap piece 40.

In operation of the valve when pressure is exerted through action of the pump 17 upon the ball 32 from beneath, the latter together with the plunger 34 will be lifted against the force of the spring 36 in said plunger and attended by exhaust or bleeding of air into the chamber 33 and from thence to the atmosphere through a series of exhaust ports 42 in the lower part of the valve casing 26. Now by virtue of its having but a single point rolling contact with the bottom face of the plug 35, of the plunger 34, the ball 32 is obviously free to accurately seek its seat 29 after having been raised, as just described, notwithstanding its subjection to the action of the spring 36 from above. As a consequence of the precise co-operation of the ball 32 with its seat 29, it will be seen that undesired leakage is prevented so that a constant working pressure is, at all times, maintained in the system through release only of excess air injected by the pump 17, the working pressure being determinable through regulation of the spring 36, by means of the hand screw 37, under aid of the gauge 20 of Fig. I. By constructing the valve 25 as herein set forth, it will be apparent that the difficulties resulting from mal-operation due to inaccurate machining of parts is entirely eliminated.

Although I have described the valve 25 of my invention as being particularly advantageous in connection with apparatus for forming doughnuts, it is to be expressly understood that the same may be used with corresponding advantages in other instances where delicate regulation is required especially when working with comparatively low pressures.

Having thus described my invention, I claim:

1. A valve of the character described embodying a casing; a closure ball co-operating with a seat afforded by a removable bushing in one end of the casing; said closure ball occupying a chamber set apart in the casing with provision accommodating bleed exhaust; a hollow cylindric pressure member with an interfitting follower, said member being confined to movement axially of the valve seat and having a closed end in single point rolling contact with the ball whereby the latter is accorded absolute freedom of lateral action in accurately seeking its seat; a resistor spring within the hollow of the pressure member intermediate the closed end and follower serving to constantly resist valve opening; and means having single point bearing contact with the follower for regulating the force exerted by the spring.

2. A valve of the character described embodying a casing; a closure ball co-operating with a seat afforded by a removable tubular bushing fitted into one end of the casing; said closure ball occupying a chamber set apart in the casing, and said chamber having a series of bleed outlets; a hollow cylindric pressure member including an interfitting follower, said member being confined to axial movement relative to the valve seat and having a closed end in single point rolling contact with the ball whereby the latter is accorded absolute freedom of lateral action in accurately seeking its seat, a resistor spring within the hollow of the pressure member intermediate the closed end and follower aforesaid, and an adjusting screw with point contact on the aforesaid pressure member follower in the valve casing to regulate the force of the resistor spring.

3. A valve of the character described embodying a casing; a closure ball co-operating with a seat afforded by a removable tubular bushing fitted into one end of the casing; said closure ball occupying a chamber in the casing and controlling a series of bleed orifices around said chamber; a hollow cylindric pressure member confined to axial movement relative to the valve seat and having a closed end in single point rolling contact with the ball whereby the latter is accorded absolute freedom of lateral action in accurately seeking its seat, a resistor spring within the hollow of the pressure member, a freely fitting follower within the hollow member aforesaid and serving as an abutment for the spring, and an adjusting screw with bearing in the valve casing to regulate the force of the spring, the shank of said screw being in single point contact with said follower.

In testimony whereof, I have hereunto signed my name at New York city, New York, this first day of November, 1927.

HARRY M. BLINN.